(12) United States Patent
Hayakawa et al.

(10) Patent No.: US 9,132,863 B2
(45) Date of Patent: Sep. 15, 2015

(54) VEHICULAR WHEEL HOUSE PORTION STRUCTURE WHEEL HOUSE PORTION

(75) Inventors: Tatsuya Hayakawa, Toyota (JP); Kohei Miyazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/004,256

(22) PCT Filed: Mar. 18, 2011

(86) PCT No.: PCT/JP2011/056642
§ 371 (c)(1),
(2), (4) Date: Sep. 10, 2013

(87) PCT Pub. No.: WO2012/127581
PCT Pub. Date: Sep. 27, 2012

(65) Prior Publication Data
US 2014/0001794 A1    Jan. 2, 2014

(51) Int. Cl.
*B62D 25/16* (2006.01)
*B62D 27/02* (2006.01)
*B21D 39/02* (2006.01)

(52) U.S. Cl.
CPC .............. *B62D 25/16* (2013.01); *B21D 39/028* (2013.01); *B62D 25/165* (2013.01); *B62D 27/02* (2013.01)

(58) Field of Classification Search
CPC ...... B62D 25/16; B62D 25/165; B62D 27/02; B21D 39/028

USPC ......................................................... 296/198
See application file for complete search history.

(56) References Cited

U.S. PATENT DOCUMENTS

| 8,272,243 B2* | 9/2012 | Hasegawa et al. ............... 72/214 |
| 2003/0067187 A1* | 4/2003 | Curtiss et al. ............... 296/146.5 |
| 2007/0035157 A1 | 2/2007 | Frank et al. |

FOREIGN PATENT DOCUMENTS

| DE | 3613853 A1 | 11/1987 |
| DE | 10 2008 048 896 A1 | 5/2009 |
| JP | U-61-122985 | 8/1986 |
| JP | A-63-126573 | 5/1988 |
| JP | 04019280 A * | 1/1992 |
| JP | A-07-081622 | 3/1995 |
| JP | A-2004-009794 | 1/2004 |
| JP | A-2006-096113 | 4/2006 |
| JP | A-2012-126263 | 7/2012 |

* cited by examiner

*Primary Examiner* — Glenn Dayoan
*Assistant Examiner* — Melissa A Black
(74) *Attorney, Agent, or Firm* — Oliff PLC

(57) ABSTRACT

A vehicular wheel house portion structure that can improve working efficiency when applying a sealer is obtained. In unhemmed portions, an end portion of a wheel house outer panel is cut off in alignment with an application center position of a sealer in a hemmed portion. Because of this, a sealer application center position in the hemmed portion and sealer application center positions in the unhemmed portions become substantially the same.

2 Claims, 10 Drawing Sheets

VEHICULAR WHEEL HOUSE PORTION STRUCTURE WHEEL HOUSE PORTION

TECHNICAL FIELD

The present invention relates to a wheel house portion structure at the rear side of a vehicle.

BACKGROUND ART

In the invention described in Patent Document 1 listed below, an arch portion disposed at a lower end of a quarter panel configuring a vehicle body outer panel and an outer end portion of an arch-shaped wheel house outer panel disposed at a vehicle inner side of the quarter panel are adhered to one another with an adhesive in a state in which one is superposed on top of the other. Additionally, a technique is disclosed of applying a sealer between the end portions of the quarter panel and the wheel house outer panel to prevent the ingress of water from the outside and prevent the occurrence of rust.
Patent Document 1: JP-A No. 2006-96113

DISCLOSURE OF INVENTION

Technical Problem

However, in the case according to the above prior art, the application center position of the sealer on the upper portion of the wheel house as seen from the vehicle side differs from the application center position of the sealer on the front portion of the wheel house.

In consideration of the above circumstances, it is an object of the present invention to obtain a vehicular wheel house portion structure that can improve working efficiency when applying a sealer.

Solution to Problem

A first aspect of the present invention provides a vehicular wheel house portion structure, comprising: a side outer panel that is placed on a vehicle width direction outer side of a vehicle side portion; and a wheel well outer panel that is disposed at a vehicle width direction inner side of the side outer panel, wherein: at least one of a vehicle front side or a vehicle rear side of a wheel arch portion formed at the side outer panel, a hemmed portion at which hemming has been performed and an unhemmed portion at which the hemming has not been performed are disposed at the side outer panel, and a distance in the unhemmed portion from an edge portion of the wheel arch portion to an end portion of the wheel house outer panel is set so as to be equal to a distance in the hemmed portion from the edge portion of the wheel arch portion to an end portion of the side outer panel.

In the above aspect, the side outer panel is disposed at the vehicle width direction outer side of the vehicle side portion, and the wheel house outer panel is disposed at the vehicle width direction inner side of the side outer panel. Here, in the wheel arch portion formed at the side outer panel, the sealer is applied to the terminal joint portion between the side outer panel and the wheel house outer panel, and on at least one of the vehicle front side or the vehicle rear side of the wheel arch portion, the distance from the edge portion of the wheel arch portion to the application center position of the sealer is set to remain the same (substantially constant).

In a case in which the distance from the edge portion of the wheel arch portion to the application center position of the sealer varies, it is necessary to change, in the middle of a job, the setting of the sealer application center position resulting from a sealer applicator or use a different sealer applicator to perform the application. However, in a case in which the distance from the edge portion of the wheel arch portion to the application center position of the sealer is configured to be substantially the same, when applying the sealer, it is not necessary to change the setting of the sealer application center position in the middle of a job or use a different sealer applicator to perform the application, as a result of which workability improves.

Further, since the sealer is applied to a portion that cannot be seen directly from the outside of the vehicle, in a case in which the distance from the edge portion of the wheel arch portion to the application center position of the sealer is substantially the same, sealing can be performed using the position of the wheel arch portion as a reference. For this reason, variations in the application center position of the sealer are reduced, sealing performance becomes stable, and quality improves. Further, the sealer can be applied smoothly, and workability is favorable.

Moreover, compared to a case in which the amount of the sealer is increased in order to prevent seal interruption caused by variations in the application center position of the sealer, costs are reduced and protrusion of the sealer toward the vehicle outer side caused by increasing the amount of the sealer does not occur and, therefore, this is preferred also in terms of design.

Here, as a specific method for configuring the distance from the edge portion of the wheel arch portion to the application center position of the sealer is set to remain substantially the same, a hemmed portion at which hemming has been performed and an unhemmed portion at which the hemming has not been performed may be disposed at the side outer panel, and the distance in the unhemmed portion from the edge portion of the wheel arch portion to an end portion of the wheel house outer panel is set so as to be equal to the distance in the hemmed portion from the edge portion of the wheel arch portion to an end portion of the side outer panel.

According to the above configuration, the hemmed portion at which the hemming is performed and the unhemmed portion at which the hemming is not performed are disposed at the side outer panel. In the hemmed portion, the end portion of the wheel house outer panel is sandwiched and held in a state in which the end portion of the side outer panel has been folded over. For this reason, in the hemmed portion, the application center position resulting from the sealer becomes the position of the end portion of the side outer panel. In the unhemmed portion, the end portion of the side outer panel and the end portion of the wheel house outer panel are disposed in a state independent of one another, so the application center position resulting from the sealer becomes the position of the end portion of the wheel house outer panel.

Here, the distance in the unhemmed portion from the edge portion of the wheel arch portion to the end portion of the wheel house outer panel is set to be equal to (substantially constant) the distance in the hemmed portion from the edge portion of the wheel arch portion to the end portion of the wheel house outer panel. That is, the distance from the edge portion of the wheel arch portion to the application center position of the sealer is configured to be substantially the same in the hemmed portion and in the unhemmed portion.

A second aspect of the present invention provides a vehicular wheel house portion structure comprising: a side outer panel that is disposed at a vehicle width direction outer side of a vehicle side portion; and a wheel house outer panel that is disposed at a vehicle width direction inner side of the side outer panel, in which at least at one of a vehicle front side or a vehicle rear side of a wheel arch portion formed at the side outer panel, a bent flange portion bent toward the vehicle inner side and diagonally upward and a bent portion formed to be bent 90 degrees toward the vehicle inner side are disposed at the side outer panel, and the distance in the bent portion from an edge portion of the wheel arch portion to an end portion of the wheel house outer panel is set so as to be equal to the distance in the bent flange portion from the edge portion of the wheel arch portion to the end portion of the wheel house outer panel.

Advantageous Effects of Invention

As described above, according to the first and second aspects of the present invention, these aspects have the superior effect that they can improve working efficiency when applying the sealer.

According to the second aspect of the present invention, this aspect has the superior effect that it can make the sealer application center positions in the hemmed portion and in the unhemmed portion substantially the same with a simple configuration.

BEST MODE FOR CARRYING OUT THE INVENTION

An embodiment of a vehicular wheel house portion structure pertaining to the present invention will be described below using FIG. 1 to FIG. 7. Arrow FR shown as appropriate in these drawings denotes a vehicle front side, arrow UP denotes a vehicle upper side, and arrow IN denotes a vehicle width direction inner side.

(Configuration of Vehicular Wheel House Portion Structure)

Figure 1:
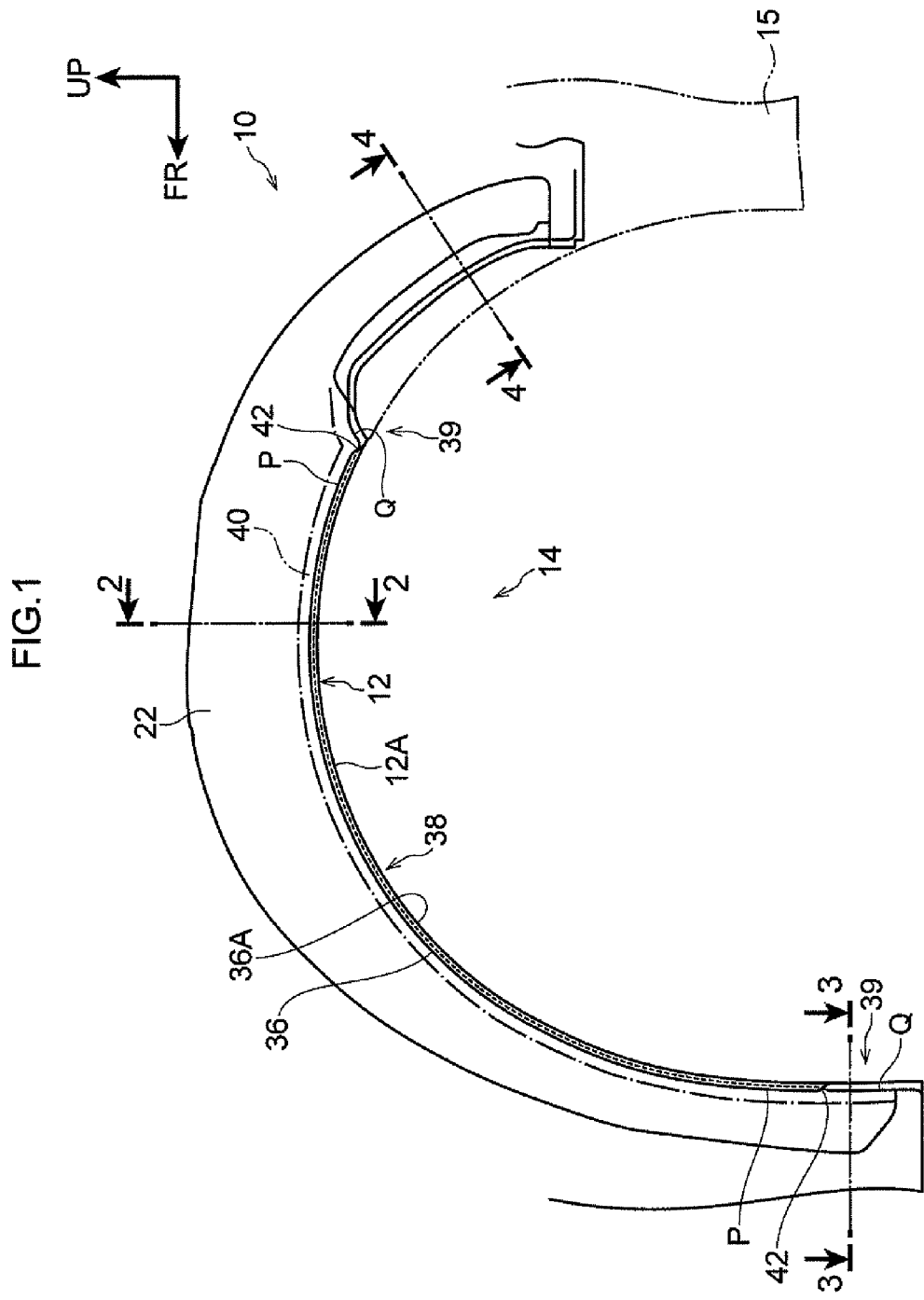
FIG. 1 is a side view, as seen from a vehicle inner side, showing a vehicle rear portion to which a vehicular wheel house portion structure pertaining to an embodiment of the present invention is applied.
Figure 2:
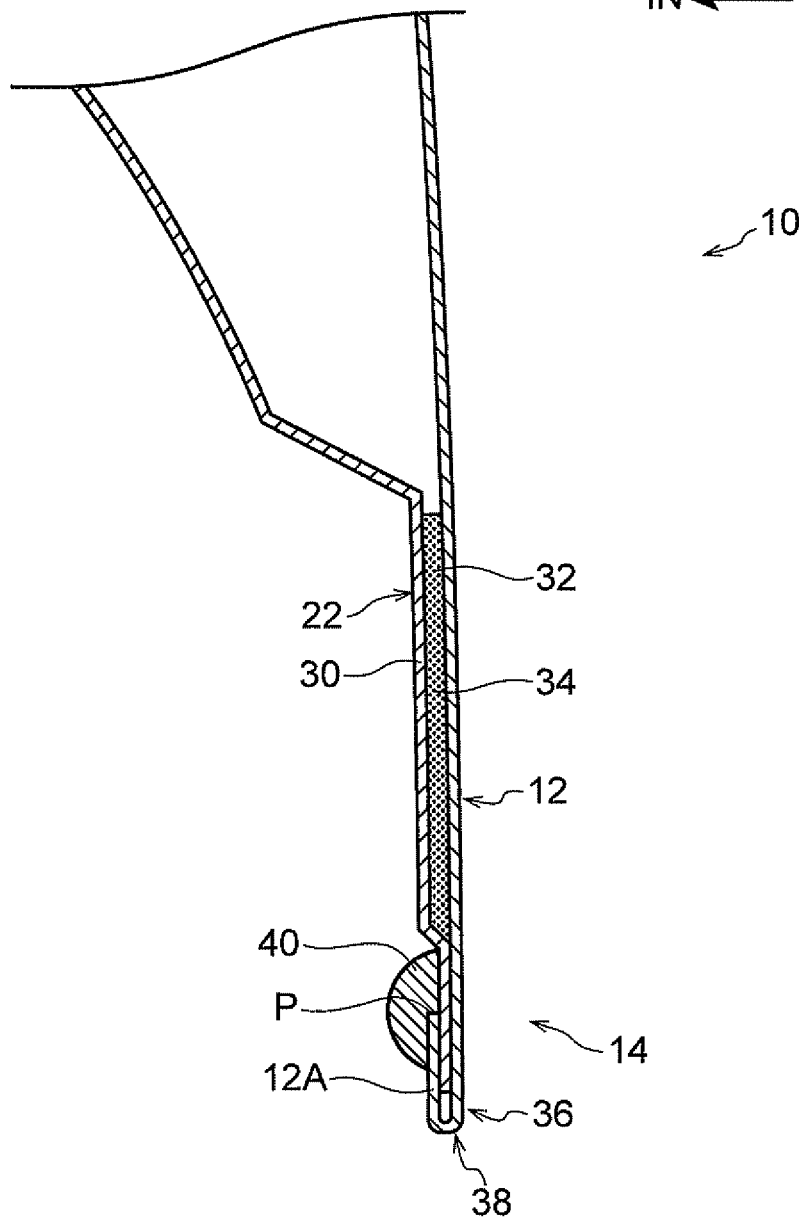
FIG. 2 is a longitudinal sectional view along line 2-2 of FIG. 1.
Figure 3:
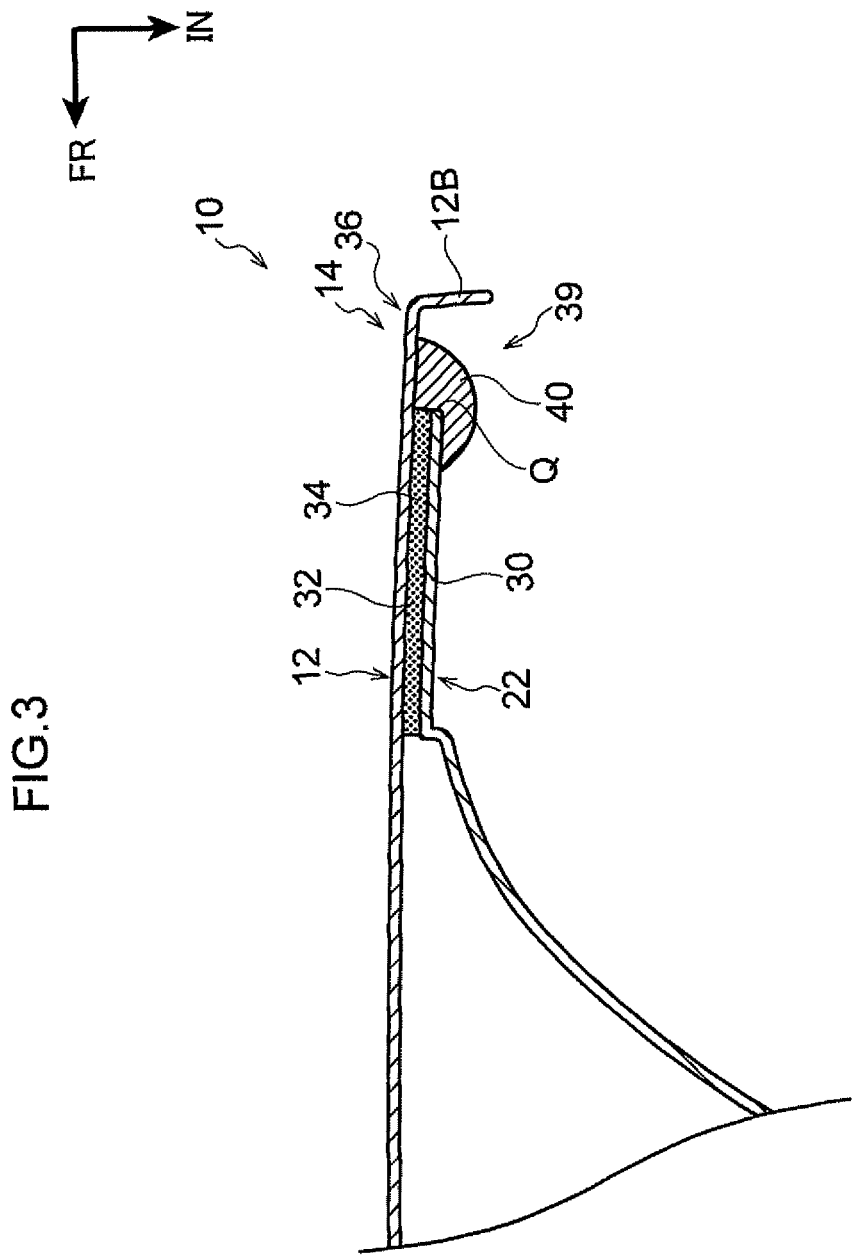
FIG. 3 is a transverse sectional view along line 3-3 of FIG. 1.
Figure 4:
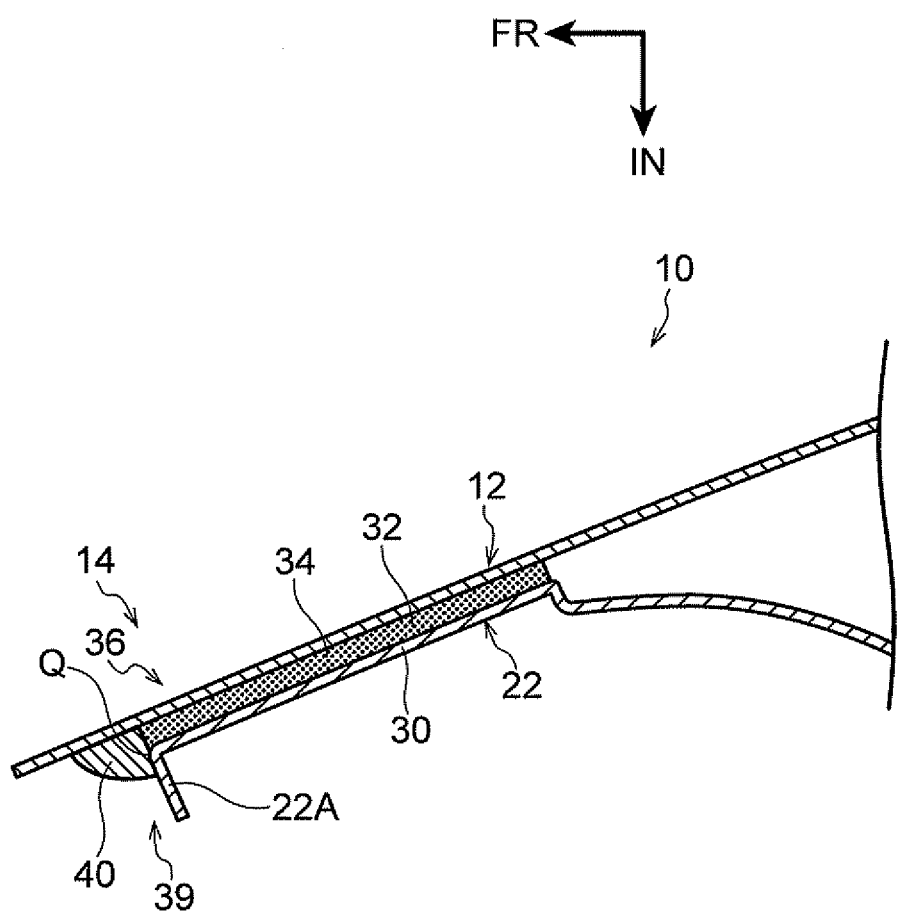
FIG. 4 is a transverse sectional view along line 4-4 of FIG. 1.

In FIG. 1, there is shown a side view, as seen from the vehicle inner side, of a vehicle rear portion to which a vehicular wheel house portion structure pertaining to the present embodiment is applied, and FIG. 2 to FIG. 4 are sectional views along line 2-2, line 3-3, and line 4-4, shown in FIG. 1, respectively.

As shown in FIG. 2 to FIG. 4, on a vehicle width direction outer side of a vehicle 10, a metal side outer panel 12 is disposed along a vehicle front-rear direction. As shown in FIG. 1, a wheel house portion 14 of the side outer panel 12 has a semicircular cut-out shape as seen in a vehicle side view so that a tire (not shown in the drawings) can be mounted therein. The part indicated by the long dashed double-short dashed line is a bumper cover 15.

Further, as shown in FIG. 2 to FIG. 4, in the wheel house portion 14, a metal wheel house outer panel 22 is disposed on the vehicle width direction inner side of the side outer panel 12. The vehicle lower end portion of the wheel house outer panel 22 has, similarly to the side outer panel 12, a semicircular cut-out shape as seen in a vehicle side view.

Additionally, on the vehicle lower portion side of the wheel house outer panel 22, an interstice forming portion 30 placed substantially parallel to the side outer panel 12 is formed along substantially the entire vehicle front-rear direction region of the wheel house outer panel 22. An interstice 32 is disposed between the interstice forming portion 30 and the side outer panel 12, and the interstice 32 is filled with an adhesive 34. The "filled" here also includes a case in which part of the interstice 32 contains the adhesive 34. Further, the adhesive 34 may also be applied to the side outer panel 12.

Additionally, the wheel house outer panel 22 is adhered to the side outer panel 12 via the adhesive 34. Moreover, in order to prevent the ingress of water into the interstice forming portion 30, a sealer 40 is applied to the end portion of the side outer panel 12 or the end portion of the wheel house outer panel 22.

Here, in a wheel arch portion 36, there are disposed a hemmed portion 38 which, as shown in FIG. 2, is hemmed by a fold-over portion 12A formed as a result of the end portion of the side outer panel 12 being folded over about 180 degrees, and unhemmed portions 39 which, as shown in FIG. 3 and FIG. 4, are not hemmed. In the case of the unhemmed portions 39, in one type, as shown in FIG. 3, a bent portion 12B formed by being bent about 90 degrees toward the vehicle inner side is disposed on the end portion of the side outer panel 12 and in another type, as shown in FIG. 4, a bent portion 22A formed by being bent about 90 degrees toward the vehicle inner side is disposed on the end portion of the wheel house outer panel 22.

As shown in FIG. 2, in the hemmed portion 38, the end portion of the wheel house outer panel 22 is sandwiched and held in a state in which the end portion of the side outer panel 12 has been folded over. For this reason, the terminal joint portion between the side outer panel 12 and the wheel house outer panel 22 in the hemmed portion 38 becomes the position of the end portion of the side outer panel 12 (the end portion of the fold-over portion 12A), and this section becomes a sealer application center position P.

As shown in FIG. 3 and FIG. 4, in the unhemmed portions 39, the end portion of the side outer panel 12 and the end portion of the wheel house outer panel 22 are disposed in a state independent of one another. For this reason, the terminal joint portions between the side outer panel 12 and the wheel house outer panel 22 in the unhemmed portions 39 become the positions of the end portions of the wheel house outer panel 22, and these sections become sealer application center positions Q. As shown in FIG. 4, in a case in which the bent portion 22A is disposed on the end portion of the wheel house outer panel 22, the bent position of the bent portion 23 becomes the sealer application center position Q.

Figure 5:
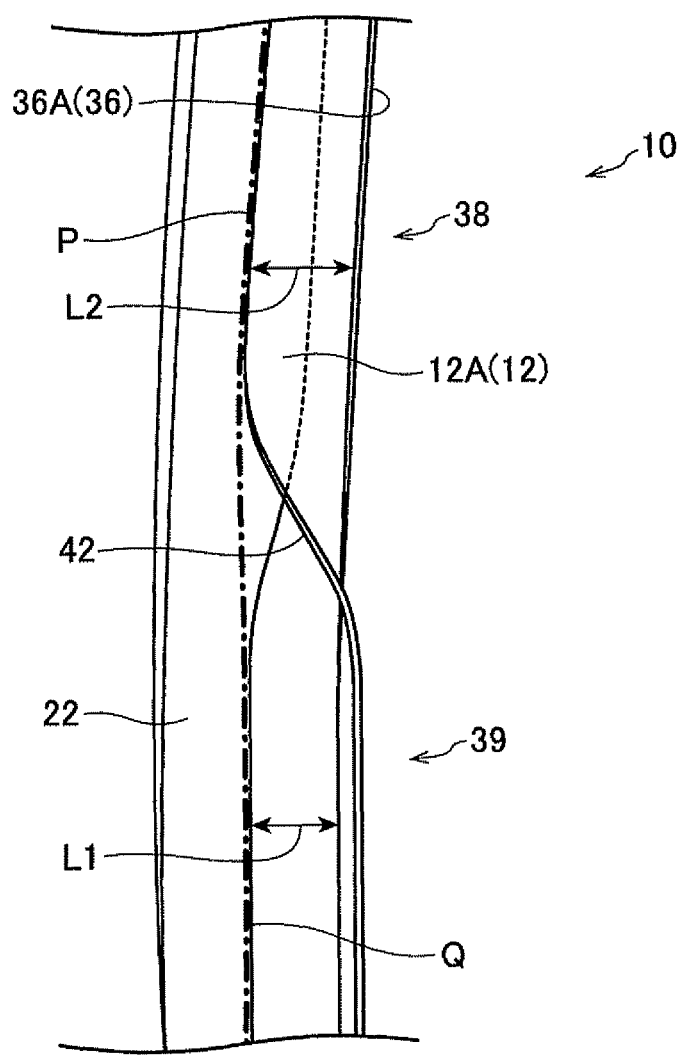
FIG. 5 is a side view as seen from the vehicle inner side of the vehicle front portion shown in FIG. 1.
Figure 6:
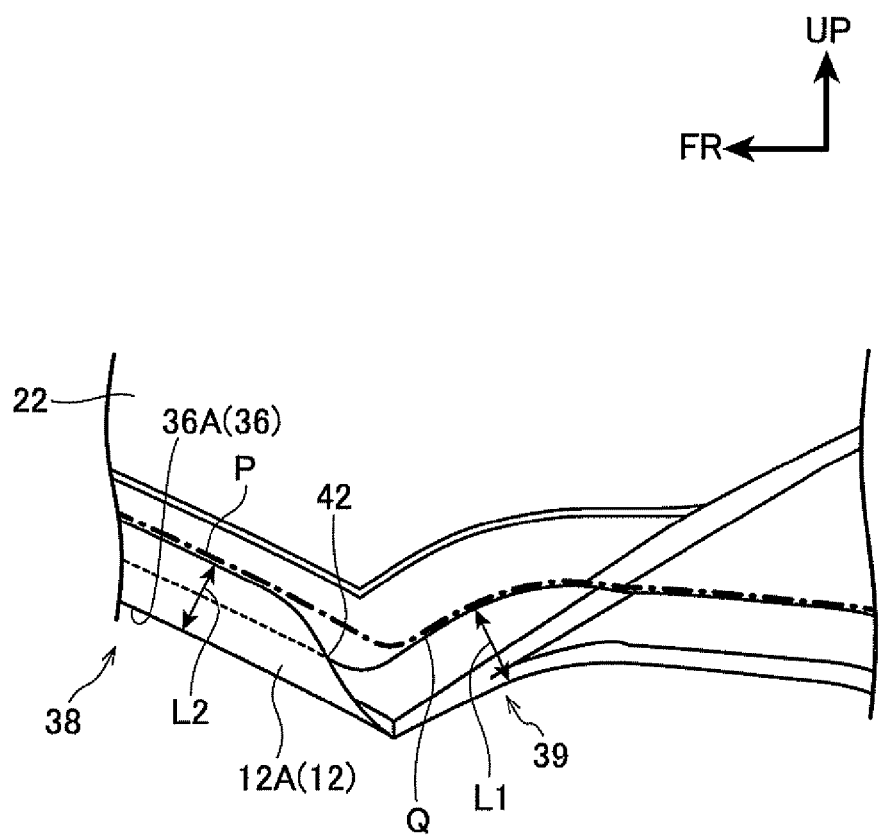
FIG. 6 is a perspective view as seen from the vehicle inner side of the vehicle rear portion shown in FIG. 1.

Here, as shown in FIG. 5 and FIG. 6, gradually varying portions 42 are disposed between the hemmed portion 38 and the unhemmed portions 39. In FIG. 5, there is shown a side view, as seen from the vehicle inner side, of the vehicle front portion side of the wheel arch portion 36 shown in FIG. 1, and in FIG. 6, there is shown a perspective view, as seen from the vehicle inner side, of the vehicle rear portion side of the wheel arch portion 36 shown in FIG. 1.

As shown in FIG. 5 and FIG. 6, in the gradually varying portions 42, the fold-over angle of the fold-over portion 12A of the end portion of the side outer panel 12 resulting from the hemming gradually opens from the hemmed portion 38 toward the unhemmed portions 39. For this reason, in the gradually varying portions 42, in conjunction with the change in the fold-over angle, not only does the distance from an edge portion 36A of the wheel arch portion 36 change but the position in the vehicle width direction also changes.

In the present embodiment, as shown in FIG. 5 and FIG. 6, a distance L1 in the unhemmed portions 39 from the edge portion 36A of the wheel arch portion 36 to the end portion of the wheel house outer panel 22 is set in such a way as to become substantially the same as a distance L2 in the hemmed portion 38 from the edge portion 36A of the wheel arch portion 36 to the end portion of the side outer panel 12.

(Action and Effects of Vehicular Wheel House Portion Structure)

Figure 9:
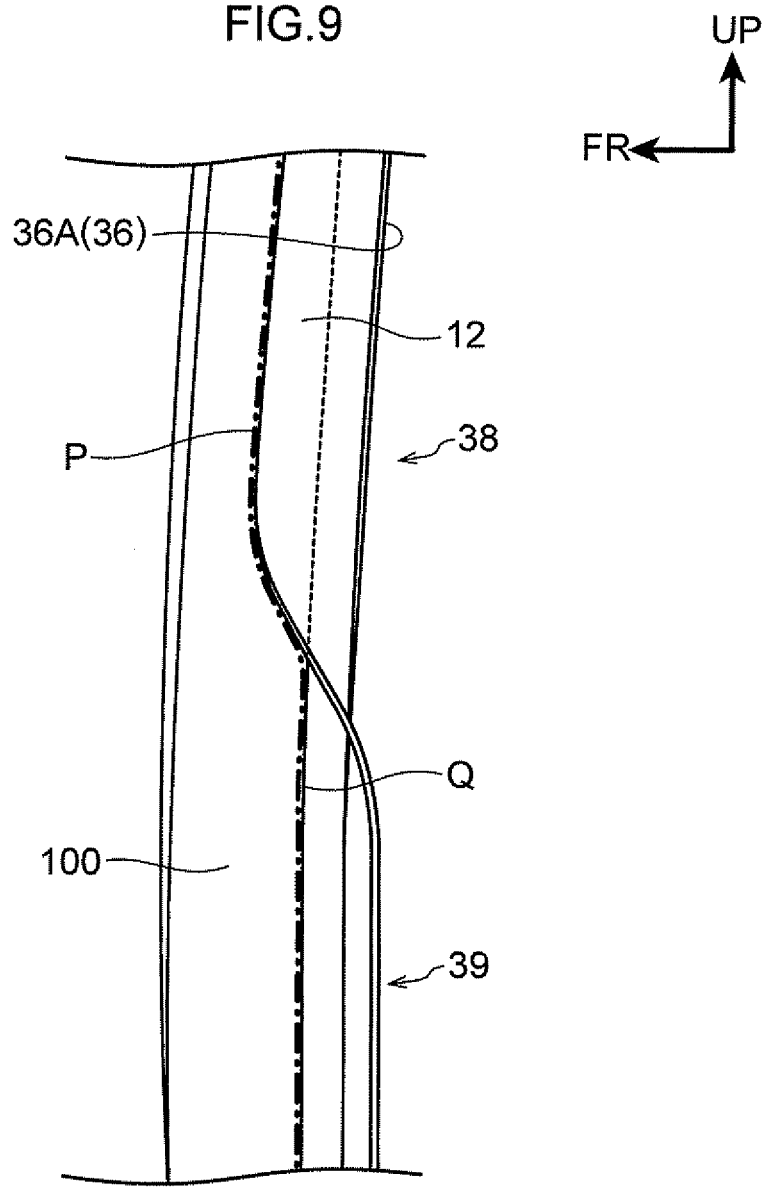
FIG. 9 is a reference drawing corresponding to FIG. 5 and is a side view as seen from the vehicle inner side of the vehicle front portion shown in FIG. 1.
Figure 10:
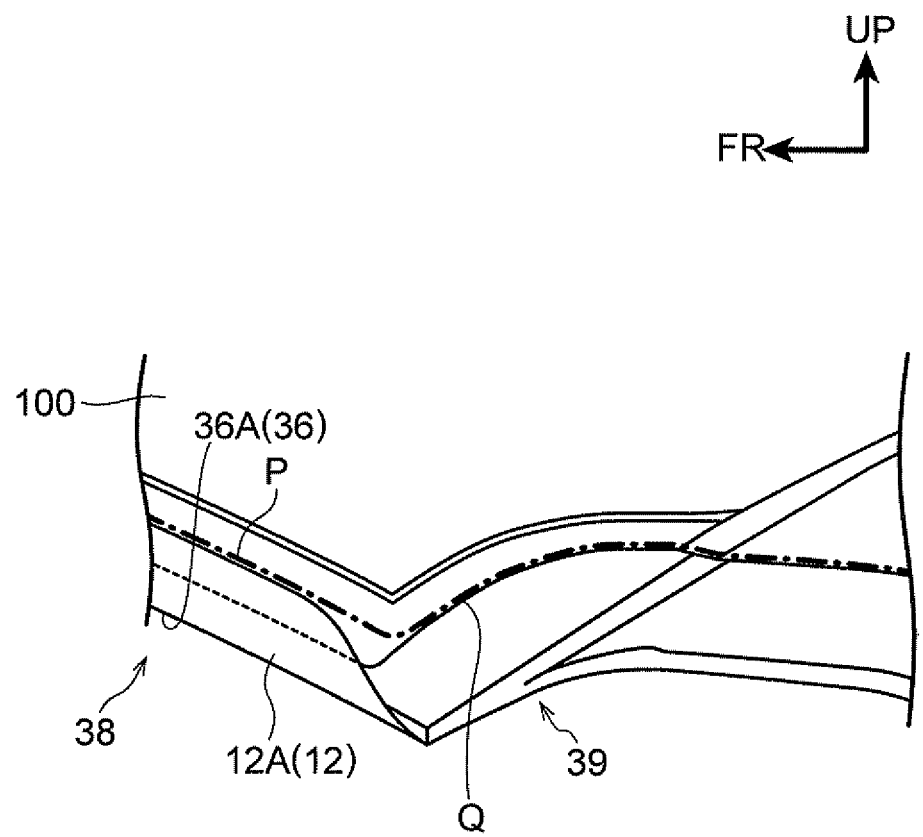
FIG. 10 is a reference drawing corresponding to FIG. 6 and is a perspective view as seen from the vehicle inner side of the vehicle front portion shown in FIG. 1.

For example, as shown in FIG. 9 and FIG. 10, in the hemmed portion 38, the position of the end portion of the side outer panel 12 becomes the sealer application center position P, and in the unhemmed portions 39, the positions of an end portion of a wheel house outer panel 100 become the sealer application center positions Q. That is, the distance from the edge portion 36A of the wheel arch portion 36 to the application center positions of the sealer 40 ends up differing.

Figure 7:
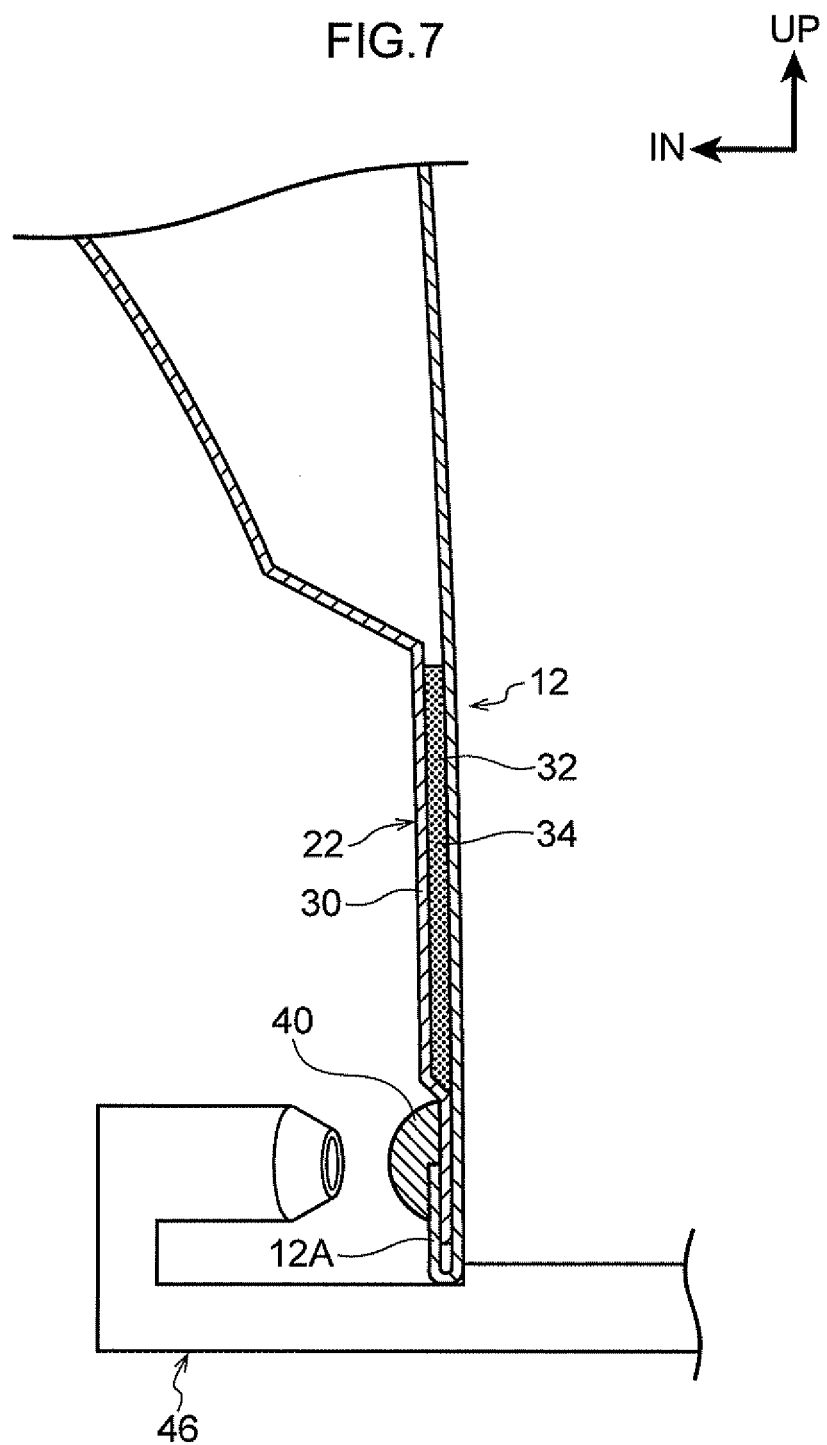
FIG. 7 is a longitudinal sectional view for describing an application center position of a sealer.

For this reason, when applying the sealer 40, it is necessary to change, in the middle of a job, the setting of the application center position of the sealer resulting from a sealer applicator 46 shown in FIG. 7 or use a different sealer applicator 46 to perform the application.

For this reason, in the present embodiment, the end portion of the wheel house outer panel 100 shown in FIG. 9 and FIG. 10 is cut off, and, as shown in FIG. 5 and FIG. 6, the positions of the end portion of the wheel house outer panel 22 are set to be substantially the same as the application center position P of the sealer in the hemmed portion 38.

That is, in the present embodiment, the distance L1 in the unhemmed portions 39 from the edge portion 36A of the wheel arch portion 36 to the end portion of the wheel house outer panel 22 and the distance L2 in the hemmed portion 38 from the edge portion 36A of the wheel arch portion 36 to the end portion of the side outer panel are set in such a way as to become substantially the same.

Because of this, in the unhemmed portions 39, the positions Q of the end portion of the wheel house outer panel 22 can be aligned with the sealer application center position P in the hemmed portion 38. For this reason, when applying the sealer 40, it is not necessary to change the setting of the sealer application center position in the middle of a job or use a different sealer applicator 46 (see FIG. 7) to perform the application, as a result of which workability improves.

Further, since the sealer 40 is applied to a section that cannot be seen directly from the vehicle outer side, in a case in which the distance from the edge portion 36A of the wheel arch portion 36 to the application center position of the sealer 40 is substantially the same, sealing can be performed using the position of the wheel arch portion 36 as a reference. For this reason, variations in the application center position of the sealer 40 are reduced, sealing performance becomes stable, and quality improves. Further, the sealer 40 can be applied smoothly, and workability is favorable.

Further, compared to a case in which the amount of the sealer 40 is increased in order to prevent seal interruption caused by variations in the application center position of the sealer 40, costs are reduced and protrusion of the sealer 40 toward the vehicle outer side caused by increasing the amount of the sealer 40 does not occur and, therefore, this is preferred also in terms of design.

Moreover, here, the end portion of the wheel house outer panel 100 shown in FIG. 9 and FIG. 10 is simply cut off, so the sealer application center positions in the hemmed portion 38 and in the unhemmed portions 39 can be made substantially the same with a simple configuration. Needless to say, the wheel house outer panel 22 shown in FIG. 5 and FIG. 6 may also be formed by constructing a new die.

As shown in FIG. 5 and FIG. 6, the gradually varying portions 42 are disposed between the hemmed portion 38 and the unhemmed portions 39. In the gradually varying portions 42, the fold-over angle of the fold-over portion 12A of the end portion of the side outer panel 12 resulting from the hemming gradually opens from the hemmed portion 38 toward the unhemmed portions 39.

Further, in the present embodiment, the sealer application center position P in the hemmed portion 38 and the sealer application center positions Q in the unhemmed portions 39 are set to be substantially the same on the vehicle front portion side and the vehicle rear portion side of the wheel arch portion 36, but the present invention may also be applied just to the vehicle front portion side or the vehicle rear portion side of the wheel arch portion 36.

Further, in the present embodiment, the sealer application center position P in the hemmed portion 38 and the sealer application center positions Q in the unhemmed portions 39 are set to be substantially the same by changing the position of the end portion of the wheel house outer panel 22, but the present invention is not limited to this. For example, the side outer panel 12 may also be extended. However, considering material costs and die machining costs, changing the position of the end portion of the wheel house outer panel 22 is preferable.

Figure 8:
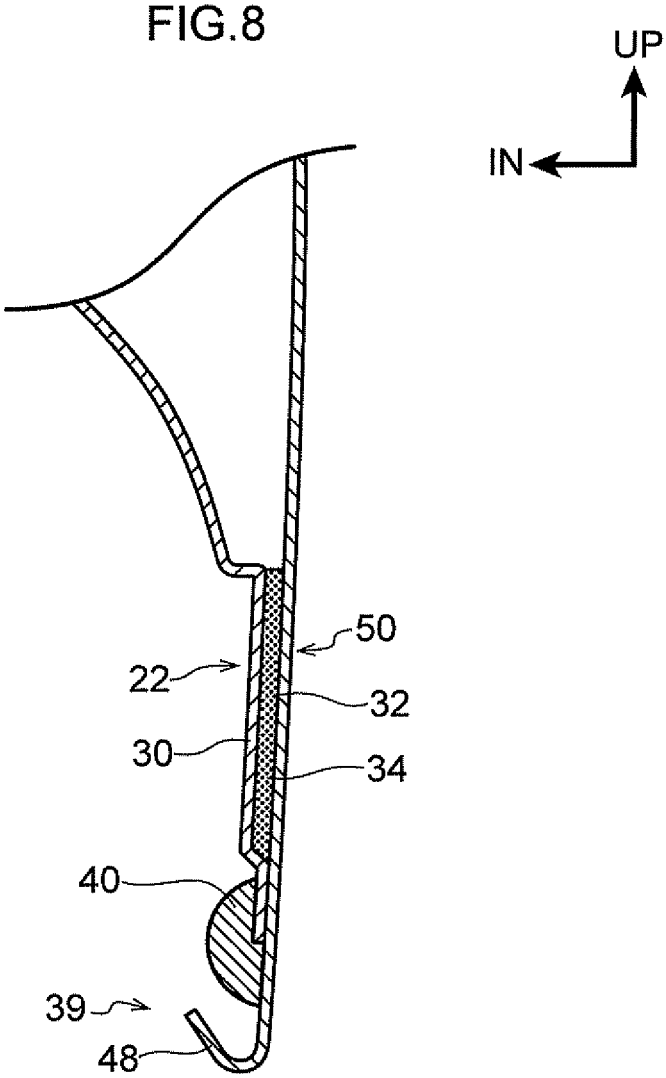
FIG. 8 is a longitudinal sectional view corresponding to FIG. 2 showing a modification of the vehicular wheel house portion structure pertaining to the embodiment of the present invention.

Further, in the above embodiment, hemming is performed on the vehicle lower end portion of the side outer panel 12, but as shown in FIG. 8, for example, a side outer panel 50 having formed, on its vehicle lower end portion, a bent flange 48 bent diagonally upward toward the vehicle width direction inner side may also be used.

The invention claimed is:

1. A vehicular wheel house portion structure, comprising:
   a side outer panel that is disposed at a vehicle width direction outer side of a vehicle side portion; and
   a wheel house outer panel that is disposed at a vehicle width direction inner side of the side outer panel, wherein:
   at least at one of a vehicle front side or a vehicle rear side of a wheel arch portion formed at the side outer panel, a hemmed portion at which hemming has been performed and an unhemmed portion at which the hemming has not been performed are disposed at the side outer panel, and
   a distance in the unhemmed portion from an edge portion of the wheel arch portion to an end portion of the wheel house outer panel is set so as to be equal to a distance in the hemmed portion from the edge portion of the wheel arch portion to an end portion of the side outer panel.

2. A vehicular wheel house portion structure, comprising:
a side outer panel that is disposed at a vehicle width direction outer side of a vehicle side portion; and
a wheel house outer panel that is disposed at a vehicle width direction inner side of the side outer panel, wherein:
at least at one of a vehicle front side or a vehicle rear side of a wheel arch portion formed at the side outer panel, a bent flange portion that is bent toward a vehicle inner side and diagonally upward and a bent portion formed to be bent 90 degrees toward the vehicle inner side are disposed at the side outer panel, and a distance in the bent portion from an edge portion of the wheel arch portion to an end portion of the wheel house outer panel is set so as to be equal to a distance in the bent flange portion from the edge portion of the wheel arch portion to the end portion of the wheel house outer panel.

\* \* \* \* \*